(12) United States Patent
Lentine et al.

(10) Patent No.: US 8,610,994 B1
(45) Date of Patent: Dec. 17, 2013

(54) SILICON PHOTONICS THERMAL PHASE SHIFTER WITH REDUCED TEMPERATURE RANGE

(75) Inventors: Anthony L. Lentine, Albuquerque, NM (US); Rohan D. Kekatpure, Albuquerque, NM (US); Christopher DeRose, Albuquerque, NM (US); Paul Davids, Albuquerque, NM (US); Michael R. Watts, Hingham, MA (US)

(73) Assignee: Sandia Corporation, Albuquerque, NM (US)

( * ) Notice: Subject to any disclaimer, the term of this patent is extended or adjusted under 35 U.S.C. 154(b) by 179 days.

(21) Appl. No.: 13/368,141

(22) Filed: Feb. 7, 2012

(51) Int. Cl.
*G02F 1/01* (2006.01)

(52) U.S. Cl.
USPC ............................................. 359/279

(58) Field of Classification Search
USPC ............................................. 359/279
See application file for complete search history.

(56) References Cited

U.S. PATENT DOCUMENTS

| 7,123,800 | B2 | 10/2006 | Kaplan |
| 7,612,887 | B2 * | 11/2009 | Choi et al. ............ 356/481 |
| 7,831,119 | B2 | 11/2010 | Khurgin |
| 2011/0019955 | A1 | 1/2011 | Morton |

OTHER PUBLICATIONS

Chen et al., "Nonlinear phase shift of cascaded microring resonators", J. Opt. Soc. Am. B, vol. 20, No. 10, Oct. 2003, pp. 2125-2132.
Heebner et al., "Optical Transmission Characteristics of Fiber Ring Resonators", IEEE Journal of Quantum Electronics, vol. 40, No. 6, Jun. 2004, pp. 726-730.
Zhang et al., "Monolithic modulator and demodulator of differential quadrature phase-shift keying signals based on silicon microrings", Optics Letters, vol. 33, No. 13, Jul. 1, 2008, pp. 1428-1430.
Hu et al., "Planar waveguide-coupled, high-index-contrast, high-Q resonators in chalcogenide glass for sensing", Optics Letters, vol. 33, No. 21, Nov. 1, 2008, pp. 2500-2502.
Heebner et al., "Enhanced all-optical switching by use of a nonlinear fiber ring resonator", Optics Letters, vol. 24, No. 12, Jun. 15, 1999, pp. 847-849.

\* cited by examiner

*Primary Examiner* — James Jones
(74) *Attorney, Agent, or Firm* — Martin I. Finston

(57) ABSTRACT

Optical devices, phased array systems and methods of phase-shifting an input signal are provided. An optical device includes a microresonator and a waveguide for receiving an input optical signal. The waveguide includes a segment coupled to the microresonator with a coupling coefficient such that the waveguide is overcoupled to the microresonator. The microresonator receives the input optical signal via the waveguide and phase-shifts the input optical signal to form an output optical signal. The output optical signal is coupled into the waveguide via the microresonator and transmitted by the waveguide. At an operating point of the optical device, the coupling coefficient is selected to reduce a change in an amplitude of the output optical signal and to increase a change in a phase of the output optical signal, relative to the input optical signal.

22 Claims, 9 Drawing Sheets

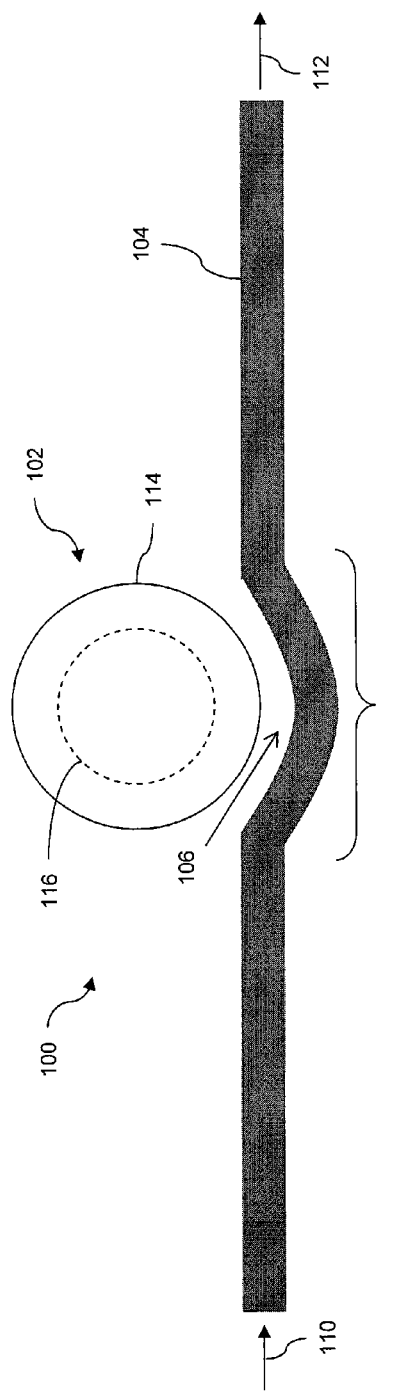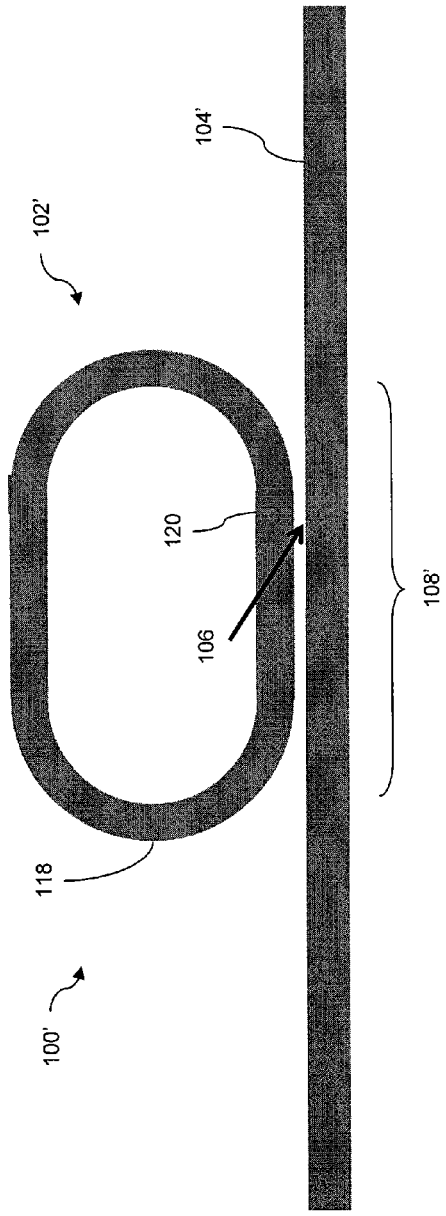

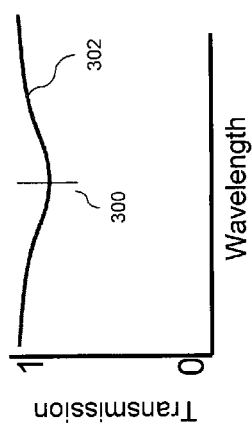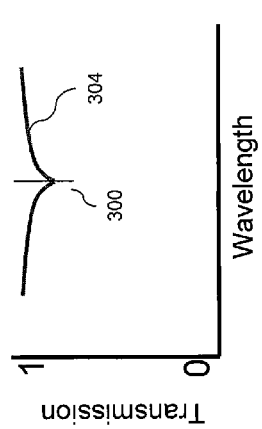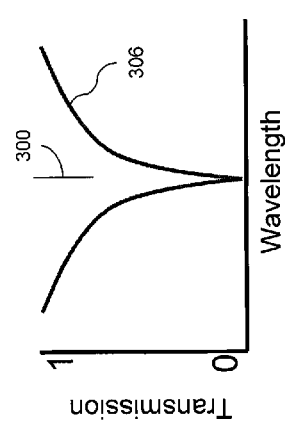

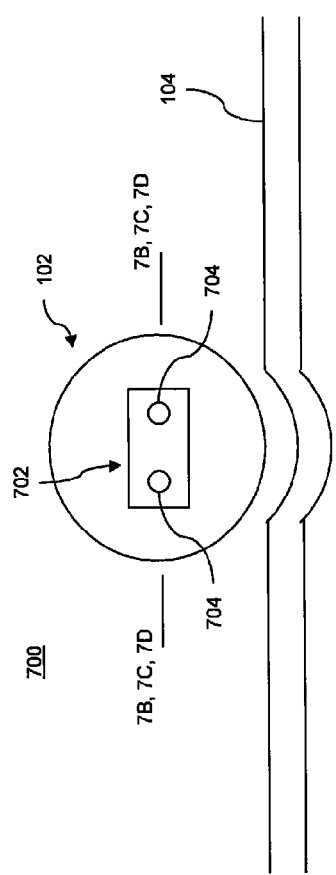
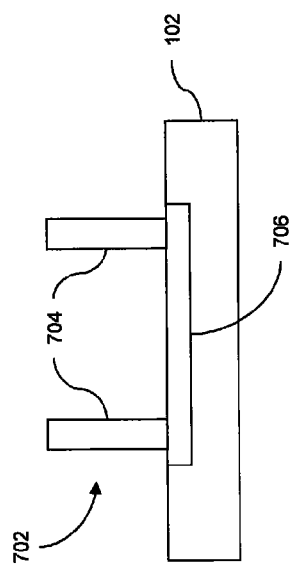
FIG. 7A
FIG. 7B

SILICON PHOTONICS THERMAL PHASE SHIFTER WITH REDUCED TEMPERATURE RANGE

STATEMENT REGARDING FEDERALLY SPONSORED RESEARCH

This invention was developed under Contract DE-AC04-94AL85000 between Sandia Corporation and the U.S. Department of Energy. The U.S. Government has certain rights in this invention.

FIELD OF THE INVENTION

The present invention relates to the field of photonic devices and, more particularly, to microresonator phase shifters with reduced temperature range for thermo-optically induced phase-shift tuning.

BACKGROUND OF THE INVENTION

Phased array antennas are known for receiving and/or transmitting signals. In general, phased array antennas may combine signals having relative phase shifts in such a way to produce a radiation pattern. The radiation pattern is typically reinforced in a desired direction (along a main lobe, also referred to herein as a beam) and suppressed in one or more undesired directions. Phased array antennas typically include phase shifters that provide phase-shifts (or delays) to adjacent radiating elements. The phase-shifts (or delays) may be used to tilt the radiated phase front and produce beams in different directions depending upon the phase-shifts applied to the individual elements of the array.

Photonic devices (such as waveguides) are known to be used in phased array antennas as phase shifters. For waveguide phase-shifters, a conventional approach is to create an optically dense medium and change some material parameter of the waveguide to produce a tunable phase shift (i.e., where an amount of phase shift may vary over time). Examples include changing the refractive index of the waveguide through application of an electrical bias (for electro-optically sensitive materials such as $LiNbO_3$) or through application of temperature (for many thermo-optically sensitive semiconductor materials including silicon).

SUMMARY OF THE INVENTION

The present invention is embodied in an optical device. The optical device includes a microresonator and a waveguide for receiving an input optical signal. The waveguide includes a segment coupled to the microresonator with a coupling coefficient such that the waveguide is overcoupled to the microresonator. The microresonator receives the input optical signal via the waveguide and phase-shifts the input optical signal to form an output optical signal. The output optical signal is coupled into the waveguide via the microresonator and transmitted by the waveguide. At an operating point of the optical device, the coupling coefficient is selected to reduce a change in an amplitude of the output optical signal and to increase a change in a phase of the output optical signal, relative to the input optical signal.

The present invention is also embodied in a phased array system. The phased array system includes a plurality of antennas disposed on a substrate and a plurality of phase shifter systems disposed on the substrate adjacent to corresponding antennas of the plurality of antennas, respectively. Each phase shifter system includes a microresonator and a waveguide configured to receive an input signal. The waveguide includes a segment coupled to the microresonator with a coupling coefficient such that the waveguide is overcoupled to the microresonator. The microresonator receives the input signal via the waveguide and phase-shifts the input optical signal to form an output signal. The output signal is coupled into the waveguide via the microresonator. At an operating point of the phase shifter system, the coupling coefficient is selected to minimize a reduction in an amplitude of the output signal and to maximize an increase in a phase of the output signal. The input signal is received from the respective antenna or the output signal is provided to the respective antenna.

The present invention is further embodied in a method of phase-shifting an input optical signal. The method includes providing the input optical signal to a waveguide; and coupling the input optical signal to a microresonator via a segment of the waveguide. The segment of the waveguide is coupled to the microresonator by a coupling coefficient such that the waveguide is overcoupled to the microresonator. The method further includes phase-shifting the input optical signal by the microresonator to form an output optical signal; coupling the output optical signal from the microresonator to the waveguide; and transmitting the output optical signal via the waveguide. At an operating point of the output optical signal, the coupling coefficient is selected to reduce a change in an amplitude of the output optical signal and to increase a change in a phase of the output optical signal, relative to the input optical signal.

BRIEF DESCRIPTION OF THE DRAWINGS

The invention may be understood from the following detailed description when read in connection with the accompanying drawing. It is emphasized, according to common practice, that various features of the drawings may not be drawn to scale. On the contrary, the dimensions of the various features may be arbitrarily expanded or reduced for clarity. Moreover, in the drawing, common numerical references are used to represent like features. Included in the drawing are the following figures:

FIGS. 1A and 1B are schematic view diagrams of exemplary phase shifters, according to embodiments of the present invention;

FIGS. 3A, 3B and 3C are example graphs of transmission as a function of wavelength for an overcoupled resonator, an undercoupled resonator and a critically coupled resonator, respectively;

FIG. 7A is a schematic view diagram of an exemplary phase shifter system, according to an embodiment of the present invention;

FIGS. 7B, 7C and 7D are cross section diagrams of a portion of the phase shifter system shown in FIG. 7A, illustrating various mechanisms for tuning the phase shift, according to embodiments of the present invention.

DETAILED DESCRIPTION OF THE INVENTION

Figure 2A:
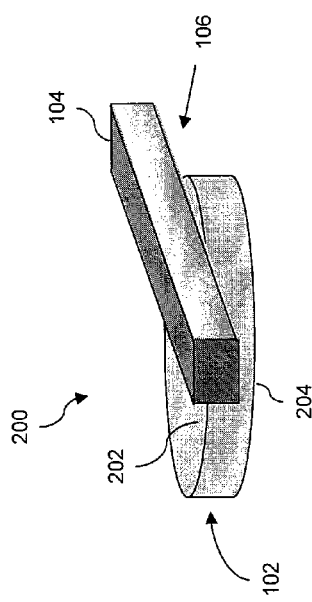
FIGS. 2A and 2B are perspective view diagrams of exemplary phase shifters, according to other embodiments of the present invention.

Aspects of the present invention relate to tunable optical devices and methods of producing a phase-shifted optical signal. Exemplary tunable optical devices may include a microresonator and a waveguide for receiving an input optical signal. The waveguide may include a segment coupled to the microresonator with a coupling coefficient such that the waveguide is overcoupled to the microresonator. The microresonator may receive the input optical signal via the waveguide and may phase-shift the input optical signal to form an output optical signal. The output optical signal may be coupled into the waveguide via the microresonator and transmitted by the waveguide. According to embodiments of the present invention, at an operating point, the coupling coefficient may be selected to reduce a change in an amplitude of the output optical signal and to increase a change in a phase of the output optical signal, relative to the input optical signal.

According to aspects of the present invention, an exemplary waveguide may include a segment that is overcoupled to the microresonator. Because of the overcoupling, more energy (i.e., the input optical signal) may be coupled into the microresonator than is able to be absorbed by the resonator. The excess energy not absorbed by the microresonator may be combined in the waveguide with the output optical signal produced by the microresonator. The excess energy (that is not absorbed by the microresonator) may reduce a drop in the amplitude of the output optical signal at the operating point caused by the input optical signal coupled into the microresonator.

According to an exemplary embodiment, an exemplary tunable optical device may be capable of producing large phase shifts, on the order of $2\pi$. According to one embodiment, the optical device may be tuned via a thermo-optic effect, by heating the optical device. Because the optical device may produce large phase shifts, the temperature range for heating the optical device may be reduced, for example, by an order of magnitude compared with conventional devices (discussed further below). According to another embodiment, the optical device may be tuned by varying the carrier concentration. According to another embodiment, a plurality of optical devices may be included in a phased antenna array. A phase-shift of the optical devices may be tuned to control an effective beam direction of an antenna output signal.

As discussed above, for waveguide phase-shifters, a common approach is to change the refractive index through an electrical bias (by controlling the carrier injection) or through temperature. For silicon waveguides, a temperature change works relatively well because silicon has a large thermo-optic coefficient.

For a waveguide mode with a propagation constant $\beta$, the phase $\phi$ picked up over a distance L (purely because of linear travel) is $\phi=\beta L=\omega n_{eff} L/c$ (where $\omega$ is the angular resonant frequency, c is the speed of light and $n_{eff}$ is the effective refractive index of the waveguide. If the effective refractive index is now changed (by applying a bias or temperature), the additional phase pickup over the same distance is $\Delta\phi=(\omega L/c)\Delta n_{eff}$, where the magnitude of $\Delta n_{eff}$ depends on the material and the applied bias/temperature.

If a small phase-shift is desired, heating (or carrier injection) of a small section of the waveguide may be sufficient. For many applications (such as dynamic phased arrays of antennas), however, phase-shifts on the order of $2\pi$ may be desired. For example, a temperature changes ($\Delta T$) for a $2\pi$ phase shift in a silicon waveguide that is a 5 µm radius half ring is described. The half ring is not a resonator, just a linear waveguide bent into a half ring of 5 µm radius, so that its length is $5\pi$ µm. For a $2\pi$ excess phase shift, the phase shift $\Delta\phi$ is:

$$\Delta\phi = 2\pi = \frac{\omega L}{c}\Delta n_{eff} = \frac{2\pi L}{\lambda}\cdot\Gamma k_{TO}\Delta T \qquad (1)$$

where $\Gamma$ represents the confinement factor, $\lambda$ represents the wavelength and $k_{TO}$ represents the thermo-optic coefficient. Thus, the temperature difference $\Delta T$, that produces the phase shift may be represented as:

$$\Delta T = \frac{\lambda}{\Gamma k_{TO} L} \qquad (2)$$

With L=$5\pi$ µm, the confinement factor $\Gamma$ approximately 0.9, and the thermo-optic coefficient $k_{TO}$=2.4×10$^{-4}$K$^{-1}$, $\Delta T$=456 K. In other words, if the waveguide is initially operating at room temperature (25° C.), a $2\pi$ phase-shift would require the waveguide to operate at 25+456=481° C. Note that the above calculation assumes a 10 µm diameter half-ring. For a smaller space, the temperature would be increased, as indicated from the inverse length dependence in Eq. (2). Accordingly, the trade-off between waveguide length and obtainable phase-shifts may place severe restrictions on device design.

Resonators may be used to induce amplitude non-linearities in the transmission response. For example, resonators may amplify the amplitude change per unit change in the effective refractive index. The use of these amplitude non-linearities may result in a lower operating power, a lower drive voltage, a smaller device size, and an increased switching speed. In conventional resonators, the output signal of the resonator picks up a phase of $2\pi$ upon passing through a resonance. But, in the same frequency range, it may also significantly change its amplitude.

Referring to FIG. 1A, a schematic view diagram of exemplary phase shifter 100 is shown. Phase shifter 100 includes microresonator 102 and waveguide 104. Waveguide 104 may be separated from microresonator 102 by gap 106. Waveguide 104 may include a segment 108 which is overcoupled with microresonator 102.

Microresonator 102 may include, for example, a microdisk or a microring (indicated by dashed line 116). Although FIG. 1A illustrates microresonator 102 having a circular symmetry, microresonator 102 may include any microresonator capable of optically coupling light to and from waveguide 104, including, but not limited to oval and elliptical microresonators.

Phase shifter 100 represents a side-coupled phase shifter, where segment 108 of waveguide 104 is coupled to a side (i.e., perimeter 114) of microresonator 102. Segment 108 may be curved to correspond to perimeter 114 of microresonator 102 (i.e., to wrap around microresonator 102). In general, overcoupling in Si and SiN systems typically involves forming sub-lithographic gaps (gap 106). Sub-lithographic gaps, however, may be difficult to fabricate. Because segment 108 is curved, a length of segment 108 that may interact with microresonator 102 is increased, thereby alleviating tight fabrication tolerances. The length of segment 108 may be increased by increasing its curvature around microresonator 102 (to change the amount of overcoupling).

Microresonator 102 and waveguide 104 may each be formed of a suitable size so that phase sifter 100 may produce a desired transmission characteristic (described below with respect to FIG. 4). In an exemplary embodiment, microresonator 102 may have a diameter between about several microns to about 30 microns. In an exemplary embodiment, gap 106 may be between about 100 nm to about 500 nm. In an exemplary embodiment, a width of waveguide 104 may be between about 350 nm to about 450 nm (for silicon waveguides) and may be between about 350 nm to about 1200 nm (for silicon nitride waveguides). A height of waveguide 104 may be, for example, from about 200 nm to about 250 nm (for both silicon and silicon nitride waveguides).

Microresonator 102 and waveguide 104 may each be formed of materials including, without being limited to, silicon, silicon nitride, indium phosphide, germanium, silica, fused quartz, sapphire, alumina, glass, gallium arsenide, silicon carbide, lithium niobate, silicon on insulator, germanium on insulator and silicon germanium.

Although not shown, microresonator 102 and waveguide 104 may be formed on a substrate. The substrate may include any suitable material including, but not limited to, silicon, indium phosphide, germanium, silica, fused quartz, sapphire, alumina, glass, gallium arsenide, silicon carbide, lithium niobate, silicon on insulator and germanium on insulator.

In operation, waveguide 104 may receive input optical signal 110. Input optical signal 110 may be overcoupled into microresonator 102 (via segment 108 and gap 106) and back out of microresonator 102 into waveguide 104. Waveguide 104 may transmit output optical signal 112 which is phase-shifted via microresonator 102.

A length of segment 108 and gap 106 may be selected to produced a desired coupling coefficient κ between microresonator 102 and waveguide 104. The coupling coefficient may be selected to reduce a change in an amplitude of output optical signal 112 relative to input optical signal 110, as well as to increase a change in a phase of output optical signal 112 relative to input optical signal 110. As discussed further below with respect to FIG. 4, the coupling coefficient may be selected to impart substantially large values of phase-shift (about $2\pi$) while maintaining the output amplitude (of output optical signal 112) to be substantially constant.

Although FIG. 1A illustrates microresonator 102 as a microdisk or a microring, microresonator 102 may include other shapes. FIG. 1B is a schematic view diagram of exemplary phase shifter 100' having microresonator 102' and waveguide 104'. Phase shifter 100' is similar to phase shifter 100 (FIG. 1A), except that microresonator 102' includes a racetrack microresonator and waveguide 104' includes straight segment 108'.

Microresonator 102' is a racetrack shape having curved sides 118 and straight sides 120. In FIG. 1B, segment 108' is illustrated as being overcoupled to one of straight sides 120 of microresonator 102'. Straight sides 120 of microresonator 102' may provide an increased length for segment 108' to interact with microresonator 102'. A length of sides 120 may be selected to provide a suitable amount of overcoupling between segment 108' and microresonator 102'. Although segment 108' is illustrated as being overcoupled to one of straight sides 120 of microresonator 102', it is understood that waveguide 104' may be replaced by waveguide 104 (FIG. 1A) having curved segment 108, with curved segment 108 being overcoupled to one of curved sides 118 of racetrack microresonator 102'.

Figure 2B:
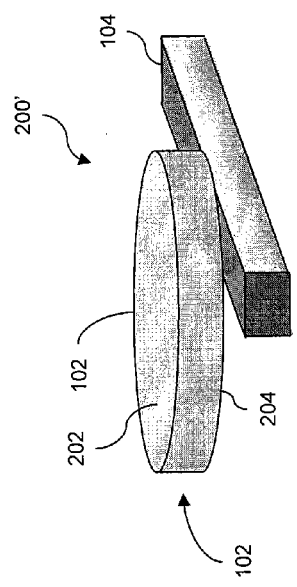

Although FIG. 1A illustrates side-coupled microresonator 102, microresonator 102 may also be coupled to waveguide 104 by vertical coupling. Referring to FIGS. 2A and 2B, perspective view diagrams of exemplary phase shifters 200, 200' having a vertical coupling are shown. Phase shifters 200, 200' are similar to phase shifter 100 of FIG. 1A, except that waveguide 104 may be overcoupled to top surface 202 (FIG. 2A) or bottom surface 204 (FIG. 2A) of microresonator 102 via gap 106.

In phase shifters 200, 200', gap 106 is formed between waveguide 104 and top surface 202 (FIG. 2A) or bottom surface 204 (FIG. 2B). The vertical coupling between microresonator 102 and waveguide 104 may be produced by deposition techniques (as opposed to lithographic patterning which may be more suitable for phase shifter 100 of FIG. 1A), which may be controlled with subnanometer precision. The position of waveguide 104 relative to top surface 202 or bottom surface 204 may be selected depending, for example, upon the materials of microresonator 102 and waveguide 104, as well as the application.

Referring to FIGS. 3A-3C, overcoupling between waveguide 104 (FIG. 1A) and microresonator 102 is further explained. In particular, FIG. 3A is an example graph of transmission as a function of wavelength for an overcoupled resonator (such as microresonator 102 in FIG. 1A); FIG. 3B is an example graph of transmission as a function of wavelength for an undercoupled resonator; and FIG. 3C is an example graph of transmission as a function of wavelength for a critically coupled resonator.

For an overcoupled resonator-waveguide system (such as shown in FIG. 1A), more energy may enter the resonator (such as microresonator 102 of FIG. 1A) from a waveguide (such as waveguide 104 of FIG. 1A) than may be lost from the resonator (after a round trip passage through the resonator and back into the waveguide). Referring to FIG. 3A, curve 302 illustrates an example transmission response for an overcoupled resonator-waveguide system. For the overcoupled system, the system may introduce a phase shift but may have a minimal change in amplitude at resonance wavelength 300.

For an undercoupled resonator-waveguide system, less energy may enter the resonator from a waveguide than may be lost from the resonator (after a round trip passage through the resonator and back into the waveguide). Referring to FIG. 3B, curve 304 illustrates an example transmission response for an undercoupled resonator-waveguide system. For the undercoupled system, the system may exhibit a dip at resonance wavelength 300. Undercoupled systems are typically used for high quality (Q) resonators for non-linear optics.

For a critically coupled resonator-waveguide system, substantially the same amount of energy may enter the resonator from a waveguide as may be lost from the resonator (after a round trip passage through the resonator and back into the waveguide). Referring to FIG. 3C, curve 306 illustrates an example transmission response for a critically coupled resonator-waveguide system. For the critically coupled case, the system may have a large drop in amplitude at resonance wavelength 300. Critically coupled systems are typically used for high extinction ratio devices.

Figure 4:
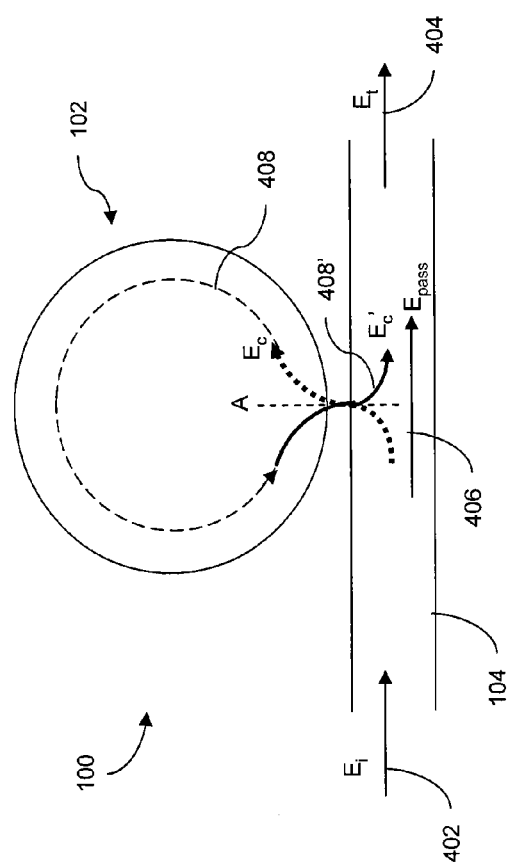
FIG. 4 is a schematic view diagram of an exemplary phase shifter, illustrating light transmission through the phase shifter, according to an embodiment of the present invention.

Referring next to FIG. 4, the amplitude and phase response of exemplary phase shifter 100 is described. Input optical signal 402 having input field $E_i$ is input to waveguide 104. At microresonator 102, a portion of input optical signal 402 is overcoupled to microresonator 102 (indicated by the dotted arrow), to form coupled signal 408 having coupled field $E_c$.

Coupled signal $E_c$ travels around microresonator 102 and may be output from microresonator 102 to waveguide 104 as output coupled signal 408' having output coupled field $E_c'$.

At microresonator 102, a further portion of input optical signal 402 which is not absorbed by microresonator 102 propagates along waveguide 104 as passed signal 406 having passed field $E_{pass}$. Passed signal 406 and output coupled signal 408' may be combined to form output signal 404 having transmitted field $E_t$.

The transmission analysis of phase shifter 100 having a microdisk resonator 102 coupled to a single-mode bus waveguide 104 is presented below. It is understood that the presented analysis is applicable to other resonator structures with a simple redefinition of coupling constants (e.g., equations for a Fabry-Perót resonator may be obtained by identifying κ as 1-R where R is the reflection coefficient).

Three field quantities may be used to calculate spectral transmittance: the input field $E_i$, the cavity field $E_c$ and the transmitted field $E_t$. $E_c$ may be calculated using a self-consistency condition. The propagation constant β along the disk circumference ($\hat{\phi}$ direction) and α, the modal power attenuation constant may also be determined. The quantity α may be obtained by weighing the material loss coefficient, $\alpha_m$, by the power confinement factor Γ: $\alpha = \Gamma \alpha_m$.

Consider the cavity-field $E_c$ just to the right of dotted line A. In traveling one round trip around the microresonator 102 (just to the left of the dotted line), the field picks up a phase factor $\Phi \equiv e^{-i\beta L} = e^{-i\phi}$ (where $\phi = \beta L = \omega n_{eff} L/c$ is the round-trip phase pickup) and is attenuated by a factor $A \equiv e^{-\alpha L/2}$. Before traveling across dotted line A, the field $E_c$ may donate a fraction of its power to the transmitted field and may also pick up a fraction of the input field $E_i$. Self-consistency means that, in steady-state, the field after a round trip should be identical. This condition may be represented as:

$$E_c = \tau e^{-\beta L} e^{-i\alpha/2} E_c - i\kappa E_i \tag{3}$$

which yields $$\frac{E_c}{E_i} = \frac{-i\kappa}{1 - \tau e^{-i\beta L} e^{-i\alpha/2}} = \frac{-i\kappa}{1 - \tau A \Phi} \tag{4}$$

In Eq. (3), the output $E_c$ represents output coupled signal 408' having output coupled field $E_c'$.

For lossless coupling, energy conservation requires that $\tau^2 + \kappa^2 = 1$. The transmitted field may be composed of the fraction from the input field $E_{pass}$ (that did not couple to the cavity) and the fraction coupled from the cavity ($E_c'$):

$$E_t = i\kappa e^{-\beta L} e^{-\alpha/2} E_c + \tau E_i = \frac{\tau - A\Phi}{1 - \tau A \Phi} E_i \tag{5}$$

Accordingly, the transfer function may be represented as:

$$\frac{E_t}{E_i} = \frac{\tau - A\Phi}{1 - \tau A \Phi} \tag{6}$$

which includes the complete amplitude response and phase response of exemplary phase shifter 100. The amplitude and phase responses are described further below.

The intensity (amplitude) transmission may be determined as:

$$T \equiv \left|\frac{E_t}{E_i}\right|^2 = \frac{(\tau - A)^2 + 4\tau A \sin^2(\phi/2)}{(1 - \tau A)^2 + 4\tau A \sin^2(\phi/2)} \tag{7}$$

Eq. (7) may be used to calculate the resonance frequencies, as well as the free spectral range (FSR), and quality (Q).

For the phase response, Eq. (6) may be written explicitly in terms of its real and imaginary parts as $$\frac{E_t}{E_i} = e^{-i(\pi + \phi)} \frac{(A - \tau \cos\phi) - i\tau \sin\phi}{(1 - \sigma A \cos\phi) + i\tau \sin\phi} \tag{8}$$

Consistent with the $e^{i\omega t}$ time convention, the phase of the output signal may be defined as:

$$\Theta(\phi) \equiv -\arg\left(\frac{E_t}{E_i}\right) \tag{9}$$

and may be determined from Eq. (8) as:

$$\Theta(\phi) = \pi + \phi + \tan^{-1}\left(\frac{\tau \sin\phi}{A - \tau \cos\phi}\right) + \tan^{-1}\left(\frac{\tau A \sin\phi}{A - \tau A \cos\phi}\right) \tag{10}$$

Figure 5A:
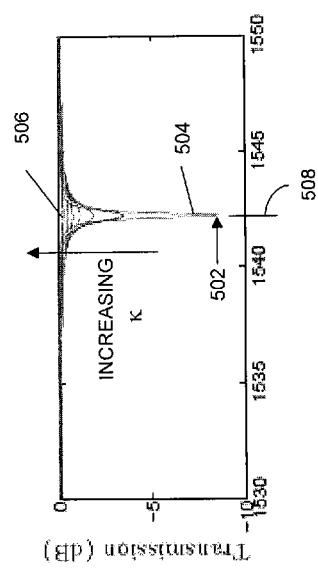
FIGS. 5A and 5B are respective example graphs of transmission and phase as a function of wavelength for various coupling coefficients of the phase shifter shown in FIG. 4, according to an embodiment of the present invention.
Figure 5B:
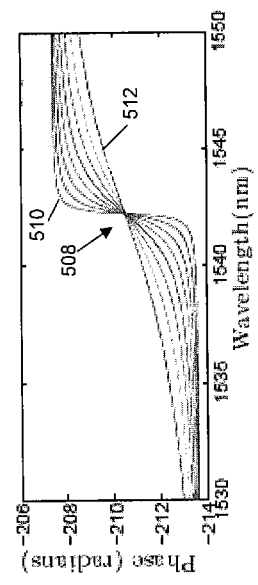

Referring to FIGS. 5A and 5B, example amplitude and phase responses, respectively, of a 3 μm disk resonator for various κ values are shown. For FIGS. 5A and 5B, a propagation loss of $\alpha = 10$ cm$^{-1}$ of approximately 43 dB/cm, an effective index of 2.7, a disk radius of 3 μm and varied κ from 0.2 to 0.9 are assumed.

In FIG. 5A, the amplitude response illustrates that there is a drop 502 in the transmitted amplitude response at operating point 508 associated with the resonant wavelength of microresonator 102 (FIG. 4). Curve 504 represents the amplitude response for κ of 0.2. Curve 506 represents the amplitude response for κ of 0.9. FIG. 5A illustrates that as coupling coefficient κ increases, the change in the amplitude response at operating point 508 decreases.

In FIG. 5B, the phase response illustrates the slope of the transmitted phase response at operating point 508. Curve 510 represents the phase response for κ of 0.2.

Curve 512 represents the phase response for κ of 0.9. FIG. 5B illustrates that as coupling coefficient κ increases, the steepness of the slope in the phase response at operating point 508 decreases.

FIGS. 5A and 5B clearly show that there may be a trade-off between the amplitude and the phase non-linearity. For smaller values of the coupling coefficient x, the phase response is sharp (such as curve 510), but the amplitude dip 502 is substantial (such as curve 504) (approaching 10 dB). If the phase shift is desired for an interference-type system, the diminished amplitude may result in a loss of interference contrast (even if it is π out of phase). The extinction of the amplitude response, however, drops rapidly with increasing values of κ. Physically, more energy is being coupled into microresonator 102 (FIG. 4) than may be absorbed by it. In other words, the system may operate in the overcoupled regime. Much of this excess energy may couple back into waveguide 104 (as passed signal 406 (FIG. 4)), which may result in a loss of extinction. The phase response (FIG. 5B) may still be fairly steep for all but the most overcoupled systems (curve 512 with κ=0.9).

To quantify this trade-off directly, a phase-change amplification factor $A_\phi$ may be defined as the maximum rate of change of the effective phase Θ with respect to the raw phase change φ:

$$A_\phi \equiv \max\left(\frac{d\Theta}{d\phi}\right) \quad (11)$$

Factor $A_\phi$ may be evaluated directly from Eq. (8).

Figure 6A:
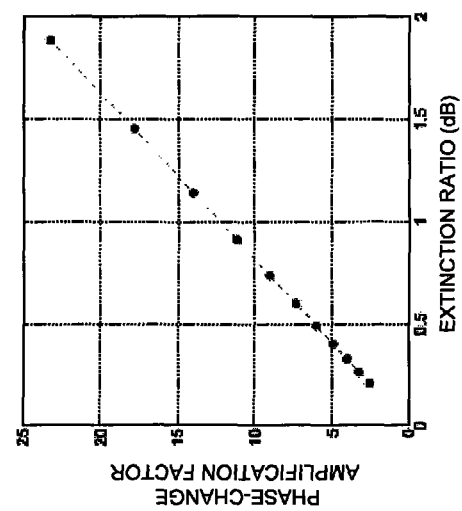
FIGS. 6A and 6B are example graphs of a phase-change amplification factor as a function of extinction ratio for the phase shifter shown in FIG. 4, according to an embodiment of the present invention.
Figure 6B:
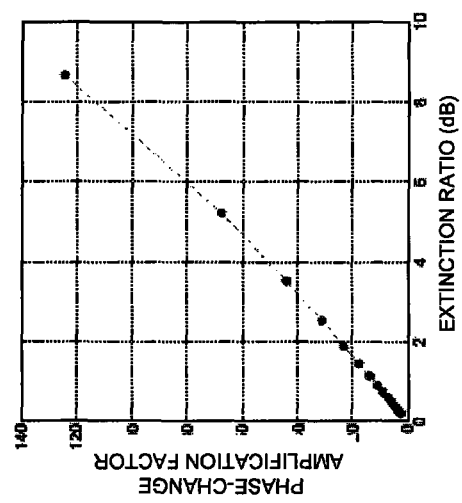

Referring to FIGS. 6A and 6B, example graphs are shown of the amplification factor as a function of the extinction ratio. FIG. 6B is a subplot of FIG. 6A for extinction ratios less than 2 dB. FIGS. 6A and 6B may be generated by implicitly varying the coupling coefficient κ (i.e., disk-guide spacing). FIGS. 6A and 6B may be generated for a propagation loss of α=10 cm$^{-1}$ of about 43 dB/cm, an effective index of 2.7, a disk radius of 3 μm and varied κ from 0.2 to 0.9.

The extinction ratio refers to the ratio between the maximum amplitude response and the minimum amplitude response (at dip 502 in FIG. 5A) for phase shifter 100 (FIG. 4). A phase amplification factor may be selected based on a tolerable extinction ratio. FIGS. 6A and 6B represent a general resonator system with any amount of loss and out-coupling.

Referring back to FIG. 4, further insight into the phase-shift enhancement action of phase shifter 100 having microresonator 102 may be obtained by analysis and simplification of Eq. (10). The phase enhancement action of phase shifter 100 may be compared to a thermally induced phase imparted to an optical mode in a straight (non-resonant) waveguide and a resonator for a given amount of temperature change. For a straight waveguide, the phase shift efficiency (dφ/dT) may be determined as:

$$\phi = \frac{\omega n_{eff} L}{c} = \frac{2\pi n_{eff} L}{\lambda} \Rightarrow \frac{d\phi}{dT} = \frac{2\pi L}{\lambda} \cdot \frac{dn_{eff}}{dT} = \frac{2\pi L}{\lambda} \cdot \Gamma k_{TO} \quad (12)$$

Here, Γ is the confinement factor of the optical mode into the waveguide and its typical value for a 400×250 nm waveguide is between about 75 and 90%. Assuming a 10 μm diameter half ring, the phase shift efficiency of the straight waveguide section may be determined as:

$$\frac{d\phi}{dT} = \frac{2\pi \times 5\pi \text{ μm}}{1.5 \text{ μm}} \times (2.4 \times 10^{-4} K^{-1}) \times 0.9 \times (180/\pi) = 0.788°/° \text{ C}.$$

The efficiency calculated above translates into a requirement of ΔT=360/0.788=456° C. for a phase change of 2π.

For resonant phase shifter 100, the maximum phase-shift efficiency may be obtained as:

$$\max\left(\frac{d\Theta}{dT}\right) = \max\left(\frac{d\Theta}{d\phi}\right) \cdot \frac{d\phi}{dT} = A_\phi \frac{d\phi}{dT} \quad (13)$$

The second term in the product is already calculated above and the first term may be obtained by differentiation of Eq. (10). Note that the first term is precisely the amplification factor (i.e., the enhancement over the phase change in a non-resonant waveguide) defined above in Eq. (11).

The inventors have determined that:

$$\max\left(\frac{d\Theta}{d\phi}\right) = \frac{A\kappa^2}{(A-\tau)(1-\tau A)} \quad (14)$$

where $\tau^2=1-\kappa^2$. Eq. (14) is an exact relation for the resonator-induced maximum phase enhancement.

A slight simplification of this general relation may be used to relate the phase enhancement to parameters such as the resonator Q and the coupling coefficient κ. To make this simplification, it is assumed that the resonator is lossless, i.e., $A=e^{-\alpha L/2} \cong 1$. Substituting this into Eq. (14) provides:

$$\max\left(\frac{d\Theta}{d\phi}\right)_{loseless\ resonator} = \frac{\kappa^2}{\left(1-\sqrt{1-\kappa^2}\right)^2} \cong \frac{4}{\kappa^2} \quad (15)$$

Inputting Eq. (12) and Eq. (15) into Eq. (13) yields:

$$\frac{d\Theta}{dT} \cong \frac{2\pi L}{\lambda} \cdot \frac{4}{\kappa^2} \cdot \Gamma k_{TO} \quad (16)$$

where, in Eq. (16), L is the round trip length of the resonator. Eq. (16) may be derived under the assumption of a lossless resonator and, thus, may be an approximate relationship (Eq. (14) is an exact relationship). However, neglecting an internal loss of a resonator may be justified in the overcoupling regime, where the dominant energy loss mechanism is coupling out of the resonator. The effect of phase shifter 100, therefore, is the addition of the amplification factor $A\phi=4/\kappa^2$ to the phase shift of the non-resonant waveguide. To obtain a typical numerical value for resonant phase-shift efficiency, the same parameters are used as for the straight waveguide section above and it is assumed that κ=0.5 (which corresponds to 25% resonator-bus power coupling efficiency). Accordingly, for phase shifter 100, the phase shift efficiency may be determined as:

$$\frac{d\phi}{dT} = \frac{2\pi \times 10\pi \text{ μm}}{1.55 \text{ μm}} \times \frac{4}{0.5^2}(2.4 \times 10^{-4} K^{-1}) \times 0.9 \times (180/\pi) = 12.61°/° \text{ C}.$$

The resonant phase-shift for κ=0.5 is thus about 16 times larger for a given temperature change and footprint than that in a non-resonant waveguide. Thus, a straight waveguide may use a temperature change of about 450° C. for a 2π phase shift, whereas phase shifter 100 may use about 28° C. for the same 2π phase shift. Larger amplification factors may be obtained by choosing smaller values of κ. These larger amplifications values would, however, relate to an increased amplitude extinction. FIGS. 6A and 6B graphically illustrate the amplitude extinction/phase amplification trade-off by plotting the two quantities calculated from the exact relation in Eqs. (7) and (14).

Figure 7C:
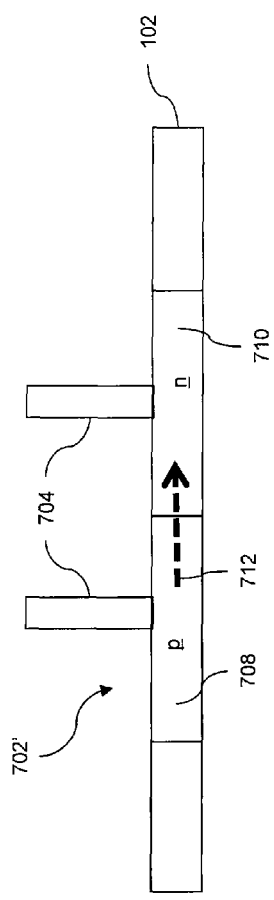
Figure 7D:
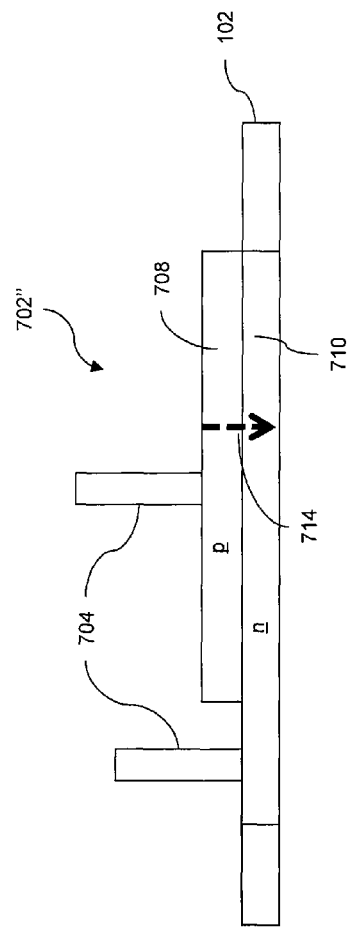

Referring to FIGS. 7A-7D, exemplary phase shifter system 700 with various tuning mechanisms 702 are shown, according to embodiments of the present invention. In particular, FIG. 7A is a schematic view diagram of phase shifter system 700 having tuning mechanism 702; FIG. 7B is a cross section diagram of microresonator 102 having microheater 706 for thermo-optic tuning; FIG. 7C is a cross section diagram of microresonator 102 having doped sections 708, 710 in a lateral arrangement for carrier injection tuning; and FIG. 7D is a cross section diagram of microresonator 102 having doped sections 708, 710 in a vertical arrangement.

Referring to FIG. 7A, phase shifter system 700 may include microresonator 102 overcoupled to waveguide 104, as described above. System 700 may also include tuning mechanism 702 as part of microresonator 102, in order to tune the phase-shift (i.e., the operating point) of microresonator 102. Tuning mechanism 702 may include electrical contacts 704 for controlling tuning mechanism 702.

In FIG. 7B, tuning mechanism 702 is represented as microheater 706 formed on a portion of microresonator 102. A thermo-optic effect may be used to change the refractive index of microresonator 102, so that the operating point of microresonator 102 may be thermally tuned. Microheater 706 may include any suitable conductive element or elements to induce a change in temperature of microresonator 102, via contacts 704. For example, a portion of the microresonator 102 may be doped to achieve a desired resistance in response to a current applied between the contacts 704.

In FIG. 7C, tuning mechanism 702' is represented as p-type doped region 708 and n-type doped region 710 formed as part of microresonator 102 and coupled to contacts 704. Tuning mechanism 702' may be electronically controlled by injected carriers or by applying an electric field. When a forward bias is applied to contacts 704, current may flow in the lateral direction indicated by arrow 712, and carriers may be injected into an undoped region of microresonator 102. The injected carriers may increase the effective refractive index of microresonator 102, causing a change of the resonant frequency (and changing the operating point).

In FIG. 7C, p-type doped region 708 and n-type doped region 710 are formed laterally as part of microresonator 102. According to another embodiment, illustrated in FIG. 7D, tuning mechanism 702" may include p-type doped region 708 and n-type doped region 710 formed vertically as part of microresonator 102. In tuning mechanism 702", current may flow in the vertical direction indicated by arrow 714 when a forward bias is applied to contacts 704.

Figure 8:
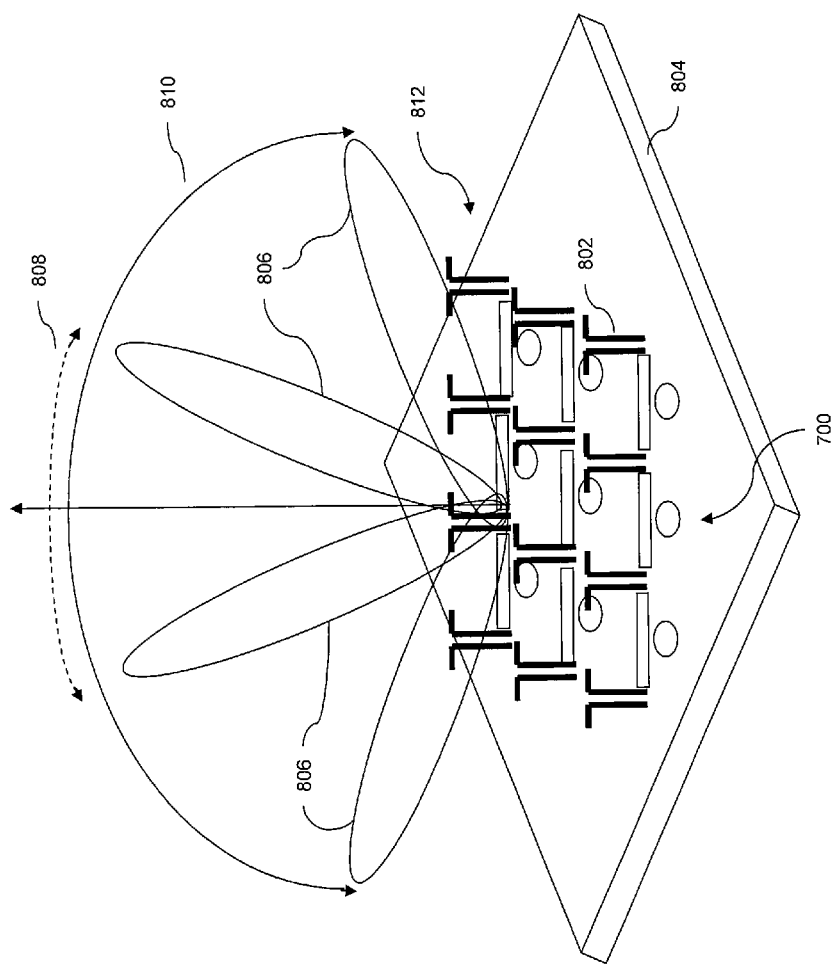
FIG. 8 is a perspective view diagram of an exemplary phased antenna array, according to an embodiment of the present invention.

Referring next to FIG. 8, a perspective view diagram of exemplary phased antenna array system 800 is shown. System 800 may include a plurality of antenna elements 802 and phase shifter systems 700 formed on substrate 804. Antenna elements 802 may form an antenna array. In FIG. 8, a two-dimensional phased array is illustrated. According to another embodiment, antenna elements 802 may form a one-dimensional phased array. Antenna elements 802 may include any suitable photonic antenna structure. Antenna elements 802 may be configured to generate or to receive a signal along beam 806.

Phase shifter system 700 may be disposed between antenna elements 802 to provide a suitable phase shift, to form beam 806 having a predetermined radiation pattern. Each phase shifter system 700 may include tuning mechanism 702 (FIG. 7A) to change the operating point of phase shifter system 700, to steer beam 806 over small scan angles 808 and/or over large scan angles 810.

For a phased antenna array, designated generally as array 812, it is desired to provide a phase change with as little change in amplitude as possible. By using phase shifter system 700, the coupling coefficient may be selected (as described above) to determine how much of an amplitude change may be tolerated. For example, FIG. 6B shows the phase amplification factor for values of extinction ratio less than 2. In FIG. 6B, it is seen that for a 1 dB extinction ratio in amplitude, there is a gain of over 10 times in phase amplification. In contrast, as described above, a waveguide may require more than a 400° C. temperature change in for a 10 μm diameter half ring. By using the thermo-optic effect, the phase amplification effect in phase shifter system 700 may provide about the same 2π phase shift in a much smaller space and with a temperature change of about 20-40° C.

For phase shifts less than 2π, carrier injection (instead of the thermo-optic effect) may be used. For example, carrier injection is typically nearly 10,000 times faster than thermo-optic effect to implement. With carrier injection tuning mechanisms (such as tuning mechanisms 702', 702" in FIGS. 7C and 7D), ultrafast beam scanning may be performed, for example, for relatively small scan angles 808. For example, carrier-injection-based phase may be performed for small scan angles 808, at potentially GHz speeds. Larger scan angles 810 may be obtained, for example, via thermo-optic phase shifts, at slower speeds. System 800 may also include hybrid schemes where beam 806 may be pre-biased to large angle 810 using the thermo-optic effect, with ultrafast scanning then being performed using carrier injection.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. An optical device comprising:
   a microresonator; and
   a waveguide situated adjacent the microresonator so as to define a coupling region within which there is optical coupling between the microresonator and the waveguide across a gap of width W along a coupling length L that is quantifiable, for an operating range of wavelengths, by a coupling coefficient κ; wherein:
   the waveguide is adapted for receiving an input optical signal, L and W are selected to give a value to κ such that the waveguide is overcoupled to the microresonator, the microresonator is adapted for receiving the input optical signal via the waveguide and phase-shifting the input optical signal, by a controllable phase shift that is responsive to a phase-tuning condition, to form an output optical signal, the output optical signal being coupled into the waveguide via the microresonator and transmitted by the waveguide, and
   L and W are further selected such that the value of κ maximizes the sensitivity of the controllable phase shift to the phase-tuning condition subject to a specified limit on how much the output optical signal is attenuated relative to the input optical signal.

2. The optical device according to claim 1, wherein the segment of the waveguide is overcoupled to a side surface of the microresonator.

3. The optical device according to claim 1, wherein the segment of the waveguide is overcoupled to one of a top surface or a bottom surface of the microresonator.

4. The optical device according to claim 1, wherein the microresonator includes at least one of a microring microresonator, a microdisk microresonator, a racetrack microresonator, an oval microresonator or an elliptical microresonator.

5. The optical device according to claim 1, wherein the segment of the waveguide includes a curvature corresponding to a curved surface of the microresonator.

6. The optical device according to claim 1, wherein the microresonator includes a racetrack microresonator and the segment of the waveguide is overcoupled to a straight portion of the racetrack microresonator.

7. The optical device according to claim 1, wherein a portion of the input optical signal is coupled into the microresonator to form the output optical signal and a remaining portion of the input optical signal not coupled into the microresonator is combined with the output optical signal and transmitted by the waveguide.

8. The optical device according to claim 1, wherein the optical device is configured to phase-shift the input optical signal between about 0 to about $2\pi$.

9. The optical device according to claim 1, wherein the microresonator includes first and second regions having opposite doping concentrations, the operating point of the optical device being tunable by carrier injection via the first and second regions.

10. The optical device according to claim 1, wherein the microresonator includes a microheater, the operating point of the optical device being tunable using a thermo-optic effect via the microheater.

11. A phased array system comprising:
a plurality of antennas disposed on a substrate; and
a plurality of phase shifter systems disposed on the substrate adjacent to corresponding antennas of the plurality of antennas, respectively, each phase shifter system comprising:
a microresonator, and
a waveguide configured to receive an input signal, the waveguide having a segment coupled to the microresonator with a coupling coefficient such that the waveguide is overcoupled to the microresonator, the microresonator receiving the input signal via the waveguide and phase-shifting the input signal to form an output signal, the output signal being coupled into the waveguide via the microresonator,
wherein, for an operating range of wavelengths, the coupling coefficient is selected to maximize a sensitivity of the input-signal phase shift to a phase-tuning condition subject to a specified limit on how much the output signal is attenuated relative to the input signal, and
the input signal is received from the respective antenna or the output signal is provided to the respective antenna.

12. The phased array system according to claim 11, wherein, for each phase shifter system, the coupling coefficient is determined at least in part by at least one of a length of the segment of the waveguide and a gap between the segment of the waveguide and the microresonator.

13. The phased array system according to claim 11, wherein each phase shifter system is configured to phase-shift the input signal between about 0 to about $2\pi$.

14. The phased array system according to claim 11, wherein each phase shifter system includes a tuning mechanism to tune the operating point of the phase shifter system.

15. The phased array system according to claim 14, wherein the tuning mechanism includes at least one of carrier injection or a thermo-optic effect.

16. The phased array system according to claim 15, wherein, for each phase shifter system, the tuning mechanism is configured to tune the operating point of the corresponding phase shifter system by the thermo-optic effect and subsequently tune the operating point of the corresponding phase shifter system by the carrier injection.

17. A method of phase-shifting an input optical signal, the method comprising:
providing the input optical signal to a waveguide;
coupling the input optical signal to a microresonator via a segment of the waveguide that is separated from the microresonator by a gap of width W along a coupling length L that is quantifiable, for an operating range of wavelengths, by a coupling coefficient $\kappa$ that is valued such that the waveguide is overcoupled to the microresonator;
phase-shifting the input optical signal by the microresonator by applying a controllable phase-tuning condition to form an output optical signal;
coupling the output optical signal from the microresonator to the waveguide; and
transmitting the output optical signal via the waveguide,
wherein L and W are further selected such that the value of $\kappa$ maximizes the sensitivity of the phase shift to the phase-tuning condition subject to a specified limit on how much the output optical signal is attenuated relative to the input optical signal.

18. The method according to claim 17, wherein the coupling of the input optical signal includes:
coupling a portion of the input optical signal into the microresonator to form the output optical signal; and
passing a remaining portion of the input optical signal not coupled into the microresonator through the waveguide, the remaining portion of the input optical signal being combined with the output optical signal from the microresonator and being transmitted by the waveguide.

19. The method according to claim 17, wherein the phase-shifting of the input optical signal includes phase-shifting the input optical signal between about 0 to about $2\pi$.

20. The method according to claim 17, further including:
tuning the operating point of the output optical signal by at least one of carrier injection or a thermo-optic effect.

21. The optical device of claim 1, wherein the phase-tuning condition is applied heat.

22. The optical device of claim 1, wherein the phase-tuning condition is an applied bias voltage.

* * * * *